United States Patent [19]

Amemiya et al.

[11] Patent Number: 4,731,838
[45] Date of Patent: Mar. 15, 1988

[54] AGC CIRCUIT USED IN A CATV RECEIVER

[75] Inventors: Yoshio Amemiya, Yokosuka; Masanori Oguino, Yokohama, both of Japan

[73] Assignee: Hitachi, Ltd., Tokyo, Japan

[21] Appl. No.: 647,529

[22] Filed: Sep. 5, 1984

[30] Foreign Application Priority Data

Sep. 5, 1983 [JP] Japan ................................ 58-161841

[51] Int. Cl.⁴ ............................................. H04N 7/167
[52] U.S. Cl. ........................................ 380/15; 358/176
[58] Field of Search ............... 358/118, 114, 176, 178, 358/120, 147, 145; 380/6, 7, 20

[56] References Cited

U.S. PATENT DOCUMENTS

| | | | |
|---|---|---|---|
| 3,531,590 | 9/1970 | Jachim | 358/178 |
| 4,024,575 | 5/1977 | Harney et al. | 358/118 |
| 4,100,575 | 7/1978 | Morio et al. | 358/120 |
| 4,472,739 | 9/1984 | Kishida et al. | 358/178 |

Primary Examiner—Stephen C. Buczinski
Assistant Examiner—Aaron J. Lewis
Attorney, Agent, or Firm—Antonelli, Terry & Wands

[57] ABSTRACT

An AGC circuit used in a subscriber's receiver of a CATV system in which the television signal is scramble-modulated so that only subscribers are allowed to view toll programs, wherein the detected video signal is conducted through a low-pass filter to extract the vertical sync signal, a keying pulse is produced in response to the vertical sync signal, and the AGC operation is performed by the keying pulse in accordance with the magnitude of the vertical sync signal.

13 Claims, 7 Drawing Figures

AGC CIRCUIT USED IN A CATV RECEIVER

The present invention relates to an AGC (Automatic Gain Control) circuit used in a cable television (CATV) receiver and, particularly, to an AGC circuit used in a CATV receiver operable to receive a scramble-modulated television signal.

CATV systems in which signals are scramble-modulated so that only subscribers are allowed to view toll programs are popular in the United States of America. In these systems, the television signal is modulated such that the horizontal sync signal has a magnitude smaller than that of the picture signal, so that standard television receivers cannot achieve horizontal synchronization. In order to receive a CATV program, a CATV receiver having a descrambling function is required. One example of such CATV system is disclosed in U.S. Pat. No. 4,024,575.

Generally, a television signal which has been subjected to scramble-modulation has the horizontal sync signal reduced below the level of the picture signal, and, therefore, the peak-type AGC and keyed AGC cannot be used, but instead the average-type AGC is employed. However, the average-type AGC has a shortcoming that even if the strength of the television signal is constant, the AGC voltage varies depending on the brightness of the screen, and on this account a very large time constant is used for the AGC detector so that the AGC voltage does not respond to the variation of the brightness of the screen. This time constant needs to be longer than 1 second, taking too long time before the picture detection output has settled following the channel selection or power-on operation, and so this system is less likely to be put into practice.

Accordingly, it is an object of the present invention to provide a fast AGC circuit used in a receiver of a CATV system in which the television signal is scramble-modulated.

In order to accomplish the fast AGC operation, according to this invention, the vertical sync signal in the scramble-modulated video signal is detected through a low-pass filter and is used to key the scramble-modulated video signal, and the keyed AGC operation is implemented by the keyed vertical sync signal.

These and other objects, features and advantages of the present invention will be apparent from the following detailed description taken in conjunction with the accompanying drawings.

Figure 1:
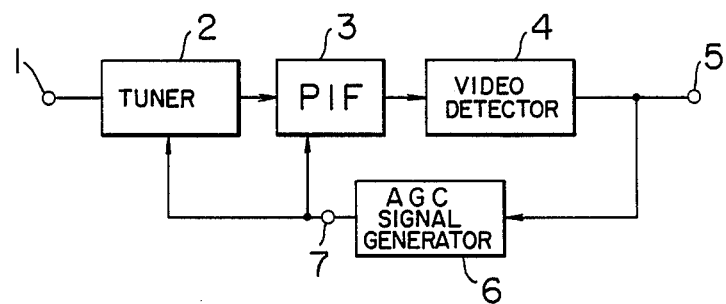
FIG. 1 is a general block diagram of the AGC circuit according to the present invention.

The AGC circuit shown in FIG. 1 includes an input terminal 1 for receiving the CATV signal, a tuner 2, a video carrier IF amplifier (PIF circuit) 3, a video detection circuit 4, a video detection output terminal 5, an AGC (automatic gain control) signal generator 6 for detecting and amplifying the AGC signal, and an AGC output terminal 7 for providing the gain control signal to the tuner 2 and PIF circuit 3.

The scramble-modulated CATV signal received at the input terminal 1 is processed through the tuner 2, PIF circuit 3 and video detection circuit 4, and delivered to the output terminal 5. The tuner 2 and PIF circuit 3 have their gains controlled by the AGC signal provided by the AGC signal generator 6 so that the video signal at the output terminal 5 has a constant amplitude.

Figure 3:
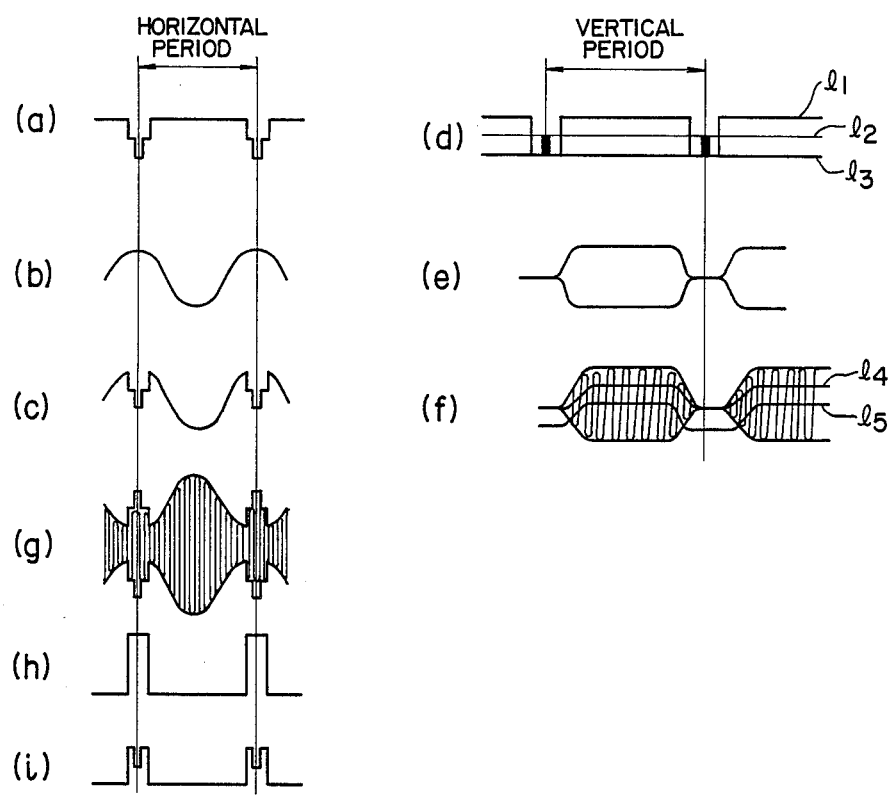
FIG. 3 is a set of waveform diagrams used to explain scramble-modulation for the video signal.

The scramble-modulation for the video signal in the CATV system will be described in connection with FIG. 3. In the figure, waveforms (a), (b), (c), (g), (h) and (i) represent the signals in one horizontal period, while waveforms (d), (e) and (f) represent the signals in one field. Waveforms (a) and (d) represent video signals before scramble-modulation, waveforms (b) and (d) are sinusoidal scrambling signals, and waveforms (d) and (f) are scramble-modulated video signals. In waveform (d) in FIG. 3, lines $l_1$, $l_2$ and $l_3$ indicate the picture signal level, the black level and the peak level of the sync signal, respectively. Waveform (e) in FIG. 3 represents the envelope of the scrambling signal, showing that the scrambling signal is absent at a portion of the vertical sync signal so that it is not scramble-modulated. The scramble-modulated signal has its picture signal portion higher than the peak of the horizontal sync signal as shown by (c) in FIG. 3 for the purpose of precluding the horizontal sync signal from being separated in the usual way. The scramble-modulated signal after modulation by the carrier is as shown by (g) in FIG. 3. In waveform (f), lines $l_4$ and $l_5$ indicate the black level and the peak of the sync signal, respectively.

The sinusoidal scrambling signal shown by (b) in FIG. 3 may be replaced with a rectangular signal having a pulse width equal to the horizontal blanking period as shown by (h) in FIG. 3. Also in this case, the scramble-modulation does not take place during the vertical blanking period, and the scrambling signal on the time scale of vertical period is as shown by (e) in FIG. 3.

Figure 2:
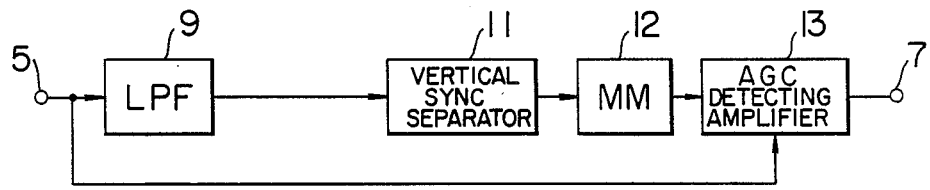
FIG. 2 is a block diagram showing the arrangement of the AGC signal generating circuit shown in FIG. 1.

Scramble-modulation for the video signal (a) by the signal (h) results in a waveform as shown by (i) in FIG. 3. The scramble-modulated picture signal exceeds the peak of the vertical sync signal as shown by (f), and to cope with this matter the AGC signal generating circuit 6 is arranged as shown in FIG. 2. In FIG. 2, the scramble-modulated video signal provided at the video detect-on output terminal 5 is fed through a low-pass filter 9 so that the sinusoidal component and picture signal component are suppressed, and a low-frequency vertical sync component is extracted by a vertical sync separation circuit 11. The vertical sync signal is fed to a monostable multivibrator 12, which expands the pulse width as wide as seven to ten times the horizontal period so as to obtain as many vertical sync pulses as possible to perform the fast AGC operation, and these vertical sync pulses are supplied to an AGC detecting amplifier 13. At the same time, the scramble-modulated video signal at the video detection output terminal 5 is directly supplied to the AGC detecting amplifier 13 so that only the vertical sync portion is extracted from the vertical pulse, then the voltage is smoothed and delivered as the AGC voltage to the terminal 7. The AGC voltage is supplied to the tuner 2 and PIF circuit 3, and used for the keyed AGC operation.

Figure 4:
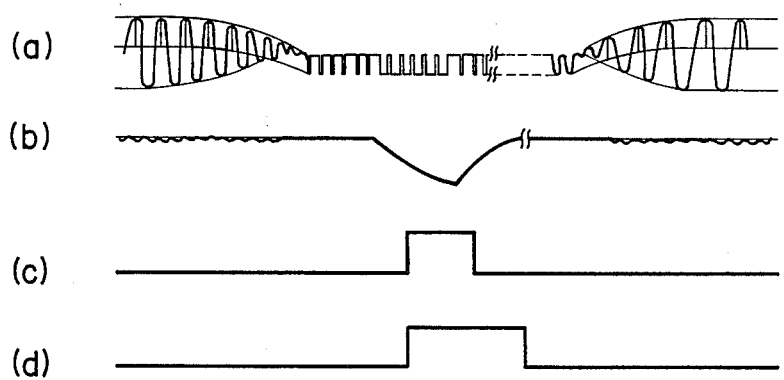
FIG. 4 is a set of waveform diagrams showing the relationship between the scramble-modulated video signal and the keying pulse for AGC detection.

FIG. 4 explains on the waveform diagram how the keying pulse is produced from the scramble-modulated video signal for the AGC detection circuit 13. In the figure, waveform (a) represents the scramble-modulated video signal, (b) represents the video signal at the output of the low-pass filter 9, (c) represents the vertical sync signal obtained at the output of the vertical sync separation circuit 11, and (d) represents the voltage waveform of the AGC keying pulse produced by expanding the width of the vertical sync signal by the monostable multivibrator 12.

Figure 5:
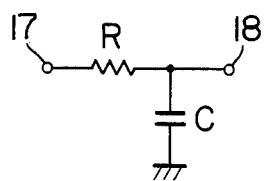
FIG. 5 is a schematic diagram showing an example of the low-pass filter.

FIG. 5 shows a particular arrangement of the low-pass filter 9, in which the scramble-modulated video signal is received at an input terminal 17 and the output is provided at an output terminal 18.

Figure 6:
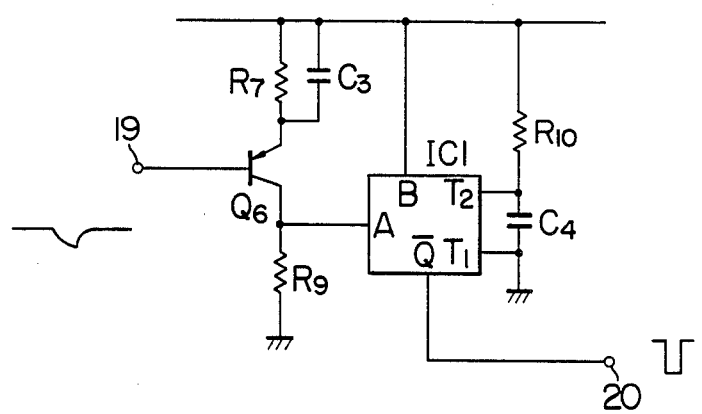
FIG. 6 is a schematic diagram showing an example of the vertical sync separation circuit and monostable multivibrator.

FIG. 6 shows a particular arrangement of the vertical sync separation circuit and monostable multivibrator. The video signal with its sinusoidal scrambling signal component suppressed by the low-pass filter 9 is supplied through a terminal 19 to a sync separation circuit of the emitter time-constant type made up of a transistor Q6, resistors R7 and R9 and a capacitor C3, by which a vertical sync pulse is retrieved at a voltage section extending negatively below the voltage across the capacitor C3, and it is supplied to terminal A of a monostable multivibrator made up of an integrated circuit IC1, a resistor R10 and a capacitor C4, which produces an AGC keying pulse having a width determined by the time-constant of the resistor R10 and capacitor C4 on output terminal 20.

Figure 7:
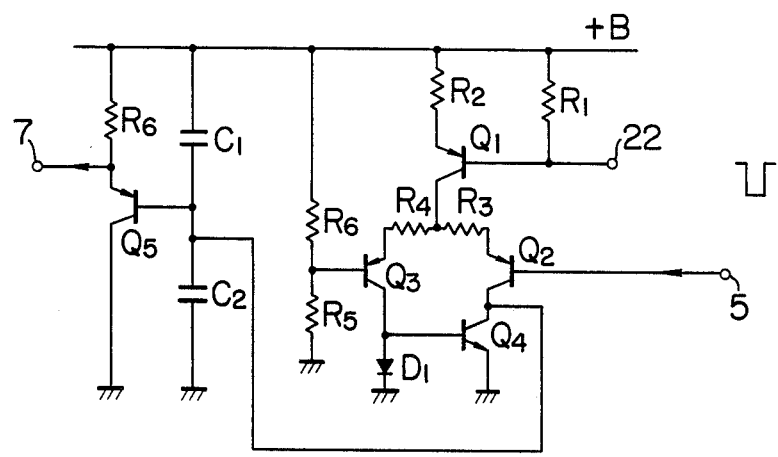
FIG. 7 is a schematic diagram showing an example of the keyed AGC circuit.

FIG. 7 shows a particular arrangement of the AGC detecting amplifier 13. The circuit receives the scramble-modulated video signal on the base of transistor Q2 through the terminal 5, and receives the AGC keying pulse on terminal 22. The arrangement includes transistors Q1–Q5, resistors R1–R6, capacitors C1 and C2, and a diode D1. The transistor Q1 conducts the power voltage to the transistors Q2 and Q3 in response to the AGC keying pulse applied to the base of Q1. The transistor Q3 has its base fixed to the AGC detection reference voltage produced by dividing the power voltage +B using the resistors R5 and R6, while the transistor Q2 has its base receiving the scramble-modulated video signal. Assuming now that the base voltage of the transistor Q2 has fallen below the base voltage of the transistor Q3, the transistor Q2 increases its collector current over that of the transistor Q3. The transistors Q2 and Q3 are connected at their collector electrodes with the transistor Q4 and diode D1, respectively, so that a current mirror circuit is formed. Since the transistor Q4 and diode D1 provide equal collector currents for the transistors Q2 and Q3, if the collector current of Q3 exceeds that of Q2, the excessive current charges the capacitor C2. Conversely, if the collector current of Q3 is smaller than that of Q2, the capacitor C2 discharges a current to the transistor Q4. The transistors Q2 and Q3 are supplied at their emitter electrodes with a voltage by the transistor Q1, which conducts the voltage in response to the AGC keying pulses. Accordingly, only the vertical sync section of the scramble-modulated video signal applied to the base of the transistor Q2 is detected under keyed AGC, and this output controls the voltage across the capacitor C2 to produce the AGC voltage. The AGC voltage is power-amplified by the transistor Q5 and delivered through the AGC output terminal 7 to the tuner 2 and PIF circuit 3. The keyed AGC circuit shown in FIG. 7 performs the keying operation for establishing the AGC voltage for every field (16.7 ms interval), allowing fast AGC operation as contrasted with the conventional AGC circuit that usually has a very long response time.

According to the present invention, as described above, only the peak section of the vertical sync signal is extracted accurately from the scramble-modulated television signal, and the keyed AGC can be accomplished solely by using the vertical sync section as fast as tens of milliseconds as compared with the conventional AGC circuit operating with a time-constant of one second or longer.

We claim:

1. An automatic gain control (AGC) circuit used in a subscriber's receiver of a cable television system comprising:
    means including a reception amplifier circuit for receiving a television signal which is scramble-modulated except for the vertical blanking period and for amplifying the received signal;
    a detector circuit for detecting the amplified video signal from said reception amplifier circuit;
    a AGC signal generating circuit including means for extracting vertical sync pulses the vertical blanking period of the detected video signal from said detector circuit and for producing an AGC signal depending on the magnitude of of the extracted vertical sync pulses of the vertical blanking period; and
    a circuit for controlling the gain of said reception amplifier circuit according to the AGC signal provided by said AGC signal generating circuit.

2. An AGC circuit according to claim 1, wherein said AGC signal generating circuit comprises means for generating a keying pulse having a predetermined pulse width in response to the detected video signal from said detector circuit, and an AGC signal detection output circuit for extracting a predetermined portion of the vertical sync signal in the detected video signal by using the keying pulse and producing an AGC signal depending on the magnitude of the extracted portion of the vertical sync signal.

3. An AGC circuit according to claim 2, wherein said keying pulse generating means comprises a vertical sync separation means for suppressing a scramble-modulated portion of the detected video signal from said detector circuit so as to separate the vertical sync signal, and means for generating the keying pulse in response to the separated vertical sync signal.

4. An AGC circuit according to claim 3, wherein said vertical sync separation means comprises a low-pass filter for suppressing a scrambling signal and picture signal component in the detected video signal from said detector circuit, and means for forming a vertical sync signal from the output of said low-pass filter.

5. An automatic gain control (AGC) circuit used in a subscriber's receiver of a cable television system comprising:
    means including a reception amplifier circuit for receiving a television signal which is scramble-modulated except for the vertical blanking period and for amplifying the received signal;
    a detector circuit for detecting the amplified video signal from said reception amplifier circuit;
    a AGC signal generating circuit including means for extracting a predetermined signal portion of the vertical blanking period of the detected video signal from said detector circuit and for producing an AGC signal depending on the magnitude of the extracted signal portion of the vertical blanking period; and a circuit for controlling the gain of said reception amplifier circuit according to the AGC signal provided by said AGC signal generating circuit;

wherein said AGC signal generating circuit comprises means for generating a keying pulse having a predetermined pulse width in response to the detected video signal from said detector circuit, an AGC signal detection output circuit for extracting a predetermined portion of the vertical sync signal in the detected video signal by using the keying pulse and producing an AGC signal depending on the magnitude of the extracted portion of the vertical sync signal, a vertical sync separation means for suppressing a scramble-modulated portion of the detected video signal from said detector circuit so as to separate the vertical sync signal, and means for generating the keying pulse in response to the separated vertical sync signal; and wherein said keying pulse generating means comprises a monostable multivibrator which produces a keying pulse having a predetermined pulse width in response to the vertical sync signal provided by said vertical sync separation means.

6. An AGC circuit according to claim 2, wherein said AGC signal detection output circuit comprises means for extracting a vertical sync portion from the detected video signal from said detector circuit during the active period of the keying pulse provided by said keying pulse generating circuit, and means for producing an AGC signal depending on the magnitude of the extracted vertical sync portion.

7. An AGC circuit according to claim 6, wherein said extraction means comprises means for transmitting the detected video signal from said detector circuit only during the active period of the keying pulse provided by said keying pulse generating circuit.

8. An AGC circuit according to claim 7, wherein said transmission means comprises means for amplifying the detected video output, and means for supplying a power voltage to said amplifying means only during the active period of the keying pulse.

9. An automatic gain control (AGC) circuit used in a subscriber's receiver of a cable television system comprising:

means including a reception amplifier circuit for receiving a television signal which is scramble-modulated except for the vertical blanking period and for amplifying the received signal;

a detector circuit for detecting the amplified video signal from said reception amplifier circuit;

a AGC signal generating circuit including means for extracting a predetermined signal portion of the vertical blanking period of the detected video signal from said detector circuit and for producing an AGC signal depending on the magnitude of the extracted signal portion of the vertical blanking period; and a circuit for controlling the gain of said reception amplifier circuit according to the AGC signal provided by said AGC signal generating circuit;

wherein said AGC signal generating circuit comprises means for generating a keying pulse having a predetermined pulse width in response to the detected video signal from said detector circuit, and an AGC signal detection output circuit for extracting a predetermined portion of the vertical sync signal in the detected video signal by using the keying pulse and producing an AGC signal depending on the magnitude of the extracted portion of the vertical sync signal; and wherein said AGC signal detection output circuit comprises means for generating a reference signal, a first current circuit for providing a predetermined current in accordance with the reference signal, a second current circuit for providing a current in accordance with the reference signal, a second current circuit for providing a current in accordance with the video signal from said detector circuit, means for supplying a power voltage to said first and second current circuits only during the active period of the keying pulse provided by said keying pulse generating means, a current mirror circuit connected to said second current circuit so as to provide a current equal in quantity to the current flowing in said first current circuit, a capacitor which is charged or discharged depending on the difference between currents flowing in said second current circuit and said current mirror circuit, and means for producing an AGC signal in accordance with a voltage across said capacitor.

10. An AGC circuit according to claim 1, wherein said television signal has a period equal to the period of the horizontal sync signal thereof divided by an integer, and wherein said television signal is modulated by a modulation signal with its substantially maximum amplitude portion being coincident with the horizontal sync signal.

11. An AGC circuit according to claim 10, wherein said modulation signal is a sinusoidal wave.

12. An AGC circuit according to claim 11, wherein said modulation signal has a period equal to that of the horizontal sync signal.

13. An AGC circuit according to claim 10, wherein said modulation signal is a pulse wave having a period equal to that of the horizontal sync signal and a pulse width substantially equal to a blanking period of the horizontal sync signal.

* * * * *